(12) United States Patent
Sato

(10) Patent No.: US 11,021,153 B2
(45) Date of Patent: Jun. 1, 2021

(54) CONTROL APPARATUS OF ELECTRIC VEHICLE

(71) Applicant: SUBARU CORPORATION, Tokyo (JP)

(72) Inventor: Yutaka Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 546 days.

(21) Appl. No.: 15/944,318

(22) Filed: Apr. 3, 2018

(65) Prior Publication Data

US 2018/0290655 A1 Oct. 11, 2018

(30) Foreign Application Priority Data

Apr. 5, 2017 (JP) .............................. JP2017-075513

(51) Int. Cl.
*B60L 9/00* (2019.01)
*G05D 1/00* (2006.01)
(Continued)

(52) U.S. Cl.
CPC .......... *B60W 30/18118* (2013.01); *B60L 7/18* (2013.01); *B60L 7/26* (2013.01); *B60L 15/2018* (2013.01); *B60L 15/2081* (2013.01); *B60W 10/08* (2013.01); *B60W 10/18* (2013.01); *B60L 2240/12* (2013.01); *B60L 2240/30* (2013.01); *B60L 2240/421* (2013.01);
(Continued)

(58) Field of Classification Search
CPC ........... B60W 30/18118; B60W 10/08; B60W 10/18; B60W 2510/087; B60L 7/18; B60L 7/26; B60L 15/2018; B60L 15/2081; B60L 2240/12; B60L 2240/30; B60L 2240/421; B60L 2240/423; B60L 2240/425; B60L 2240/80; B60L 2250/26; Y02T 10/72
USPC .......................................................... 701/22
See application file for complete search history.

(56) References Cited

U.S. PATENT DOCUMENTS

| 6,039,673 | A | * | 3/2000 | Mikami | ............... F16H 61/0206 477/93 |
| 2003/0137192 | A1 | * | 7/2003 | Hano | ...................... B60T 7/122 303/192 |
| 2004/0012250 | A1 | | 1/2004 | Kuno et al. | |

FOREIGN PATENT DOCUMENTS

| JP | 2003-182404 A | 7/2003 |
| JP | 2010-149698 A | 7/2010 |

(Continued)

OTHER PUBLICATIONS

Japanese Office Action issued in corresponding Japanese Patent Application No. 2017-75513, dated Feb. 19, 2019, with English Translation.

*Primary Examiner* — Mahmoud S Ismail
(74) *Attorney, Agent, or Firm* — McDermott Will & Emery LLP

(57) ABSTRACT

A control apparatus of an electric vehicle including a motor capable of outputting a vehicle driving force that is a driving force acting on the electric vehicle, and a brake device configured to generate a vehicle braking force that is a braking force acting on the electric vehicle in accordance with a brake operation performed by a driver, includes: a controller. The controller is configured to start a first hill-hold control for maintaining the electric vehicle in a stopped state by using the vehicle driving force generated by the motor as a stopping force for stopping the electric vehicle when the brake operation is interrupted.

20 Claims, 10 Drawing Sheets

(51) Int. Cl.
*G05D 3/00* (2006.01)
*G06F 7/00* (2006.01)
*G06F 17/00* (2019.01)
*B60W 30/18* (2012.01)
*B60L 15/20* (2006.01)
*B60W 10/18* (2012.01)
*B60W 10/08* (2006.01)
*B60L 7/18* (2006.01)
*B60L 7/26* (2006.01)

(52) U.S. Cl.
CPC ... *B60L 2240/423* (2013.01); *B60L 2240/425* (2013.01); *B60L 2240/80* (2013.01); *B60L 2250/26* (2013.01); *B60W 2510/087* (2013.01); *Y02T 10/72* (2013.01)

(56) References Cited

FOREIGN PATENT DOCUMENTS

| | | | |
|---|---|---|---|
| JP | 2011-072189 A | 4/2011 | |
| JP | 2011-166996 A | 8/2011 | |
| JP | 2011-229348 A | 11/2011 | |
| JP | 2013-244781 A | 12/2013 | |
| JP | 2016-111760 A | 6/2016 | |

* cited by examiner

CONTROL APPARATUS OF ELECTRIC VEHICLE

CROSS-REFERENCE TO RELATED APPLICATIONS

The present application claims priority from Japanese Patent Application No. 2017-075513 filed on Apr. 5, 2017, the entire contents of which are hereby incorporated by reference.

BACKGROUND

1. Technical Field

The present invention relates to a control apparatus of an electric vehicle.

2. Related Art

In the related art, for the purpose of preventing a vehicle from moving backward and sliding down when the vehicle is about to start on a sloping road, there is hill-hold control for maintaining a vehicle in a stopped state by generating a stopping force for stopping the vehicle when a driver's brake operation is interrupted while the vehicle is stopped. As such hill-hold control, hill-hold control in which a driving force output by a motor is used as a stopping force in an electric vehicle that uses a motor driven by electric power as a driving source has been proposed (e.g., refer to Japanese Unexamined Patent Application Publication No. 2011-072189).

SUMMARY OF THE INVENTION

An aspect of the present invention provides a control apparatus of an electric vehicle including a motor capable of outputting a vehicle driving force that is a driving force acting on the electric vehicle, and a brake device configured to generate a vehicle braking force that is a braking force acting on the electric vehicle in accordance with a brake operation performed by a driver. The control apparatus includes: a controller configured to start a first hill-hold control for maintaining the electric vehicle in a stopped state by using the vehicle driving force generated by the motor as a stopping force for stopping the electric vehicle when the brake operation is interrupted. When a set time elapses after the first hill-hold control is started with no accelerator operation performed by the driver, the controller starts a second hill-hold control for maintaining the electric vehicle in the stopped state by stopping an output of the vehicle driving force from the motor and using the vehicle braking force from the brake device as the stopping force. The control apparatus further comprises a set time decision module configured to decide the set time on a basis of a cumulative value of a number of executions of the first hill-hold control.

An aspect of the present invention provides a control apparatus of an electric vehicle including a motor capable of outputting a vehicle driving force that is a driving force acting on the electric vehicle, and a brake device configured to generate a vehicle braking force that is a braking force acting on the electric vehicle in accordance with a brake operation performed by a driver. The control apparatus includes: circuitry configured to start a first hill-hold control for maintaining the electric vehicle in a stopped state by using the vehicle driving force generated by the motor as a stopping force for stopping the electric vehicle when the brake operation is interrupted. When a set time elapses after the first hill-hold control is started with no accelerator operation performed by the driver, the circuitry starts a second hill-hold control for maintaining the electric vehicle in the stopped state by stopping an output of the vehicle driving force from the motor and using the vehicle braking force from the brake device as the stopping force. The circuitry is configured to decide the set time on a basis of a cumulative value of a number of executions of the first hill-hold control.

DETAILED DESCRIPTION

Figure 1:
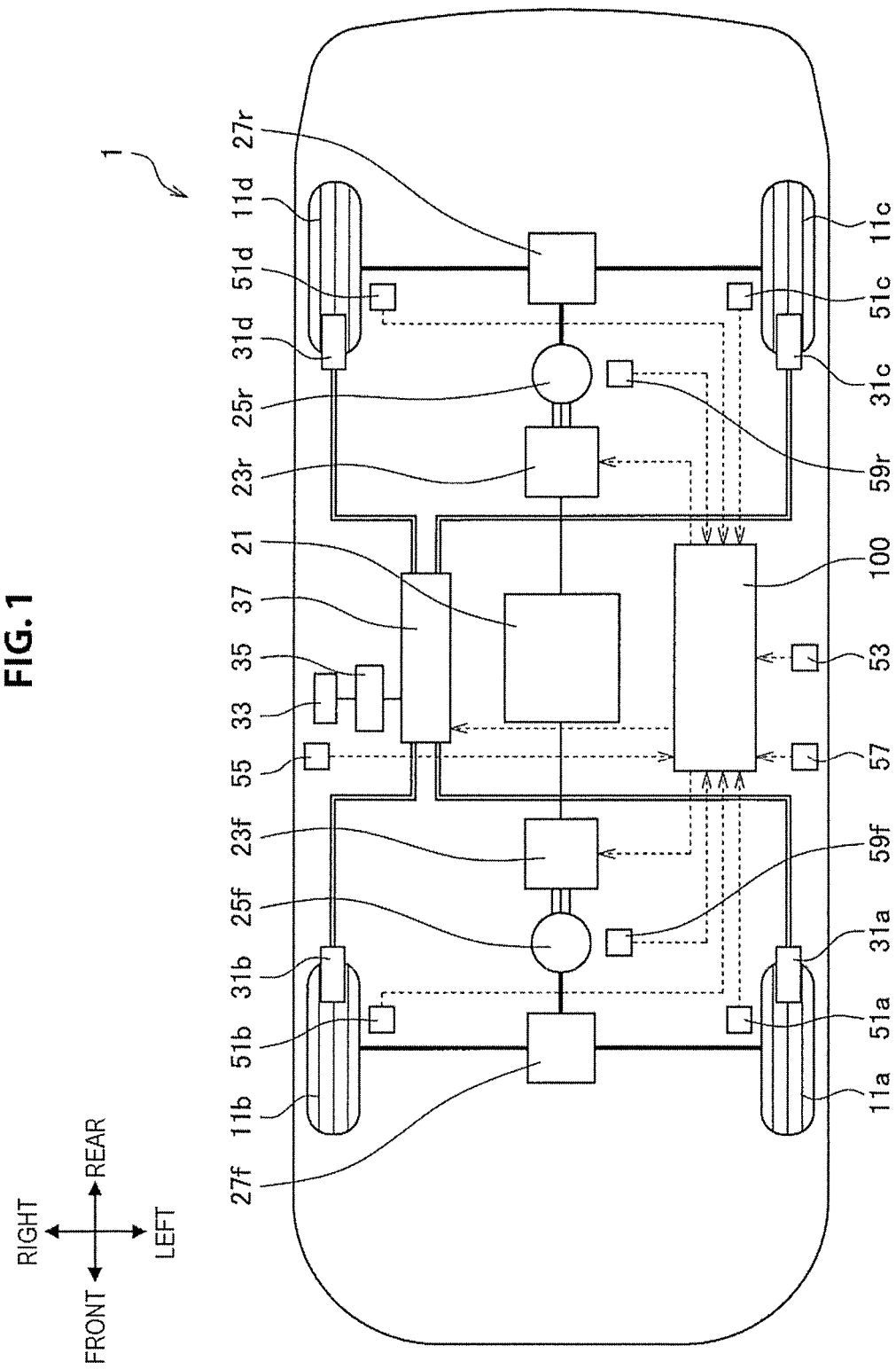
FIG. 1 is a schematic diagram illustrating an example of an outlined configuration of an electric vehicle in which a control apparatus according to an example of the present invention is mounted.

In hill-hold control, a braking force generated by a brake device, for example, can be used as a stopping force. In such a case, hydraulic pressure used to drive the brake device may cause a situation in which the braking force may not sharply decline immediately after an accelerator operation is performed for starting the vehicle. Accordingly, the feeling of driving when the vehicle starts may be degraded. Thus, using hill-hold control for maintaining the electric vehicle in a stopped state by using a driving force output by a motor as a stopping force in the electric vehicle is expected to improve the feeling of driving when the vehicle starts.

However, in the hill-hold control in which a driving force output by a motor is used as a stopping force, a state of a current flowing on a specific path in the motor continues. Thus, there is concern of the motor being heated to an excessively high temperature. If the motor is heated to an excessively high temperature, a possibility of the motor exhibiting degraded performance and being damaged increases.

It is desirable to provide a novel and improved control apparatus of an electric vehicle that can prevent a motor from being heated to an excessively high temperature while improving the feeling of driving.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

1. CONFIGURATION OF ELECTRIC VEHICLE

First, a configuration of an electric vehicle 1 in which a control apparatus 100 according to an example of the present invention is mounted will be described with reference to FIGS. 1 and 2.

FIG. 1 is a schematic diagram illustrating an example of an outlined configuration of the electric vehicle 1 in which the control apparatus 100 according to the example is mounted. In the illustration of the electric vehicle 1 in FIG. 1, a travel direction of the electric vehicle 1 is defined as a forward direction, the direction opposite to the travel direction is defined as a backward direction, and the left side and the right side in a state in which an object faces in the travel direction are defined as a left direction and a right direction, respectively. FIG. 2 is a block diagram illustrating an example of a functional configuration of the control apparatus 100 according to the example.

The electric vehicle 1 includes, for example, a battery 21, an inverter 23f and an inverter 23r, a motor 25f and a motor 25r, a front differential device 27f, a rear differential device 27r, and a wheel 11a, a wheel 11b, a wheel 11c, and a wheel 11d as illustrated in FIG. 1. The wheel 11a, the wheel 11b, the wheel 11c, and the wheel 11d correspond to a left front wheel, a right front wheel, a left rear wheel, and a right rear wheel. Note that, when the wheel 11a, the wheel 11b, the wheel 11c, and the wheel 11d are not particularly distinguished from each other, the wheels will be referred to simply as wheels 11 below.

The battery 21 is a battery whose electric power can be charged and discharged. As the battery 21, for example, a lithium-ion battery, a lithium-ion polymer battery, a nickel-hydrogen battery, a nickel-cadmium battery, or a lead storage battery is used, however, other types of batteries may be used. The battery 21 accumulates electric power to be supplied to the motors 25f and 25r. The battery 21 is coupled to the motor 25f via the inverter 23f. In addition, the battery 21 is coupled to the motor 25r via the inverter 23r.

The inverters 23f and 23r are power converters that perform bidirectional conversion of electric power. The inverters 23f and 23r include, for example, three-phase bridge circuits. Note that, when the inverter 23f and the inverter 23r are not particularly distinguished from each other, the inverters will be referred to simply as inverters 23 below.

The inverter 23f can convert DC power supplied from the battery 21 to AC power and supply the AC power to the motor 25f. In addition, the inverter 23f can convert AC power regenerated by the motor 25f to DC power and supply the DC power to the battery 21. The inverter 23f includes a switching element, and the conversion of electric power by the inverter 23f is controlled when operations of the switching element are controlled.

In addition, the inverter 23r can convert DC power supplied from the battery 21 to AC power and supply the AC power to the motor 25r. In addition, the inverter 23r can convert AC power regenerated by the motor 25r to DC power and supply the DC power to the battery 21. The inverter 23r includes a switching element, and the conversion of electric power by the inverter 23r is controlled when operations of the switching element are controlled.

The motors 25f and 25r can output driving forces when the motors are driven using the supplied power (power-driving). As the motors 25f and 25r, for example, three-phase AC motors are used. The motors 25f and 25r can output vehicle driving forces which are driving forces acting on the electric vehicle 1. In addition, the motors 25f and 25r may function as a generator that is regeneratively driven while the electric vehicle 1 reduces its speed and generates electric power using rotation energy of the wheels 11 (regeneration function). Note that, when the motors 25f and 25r are not particularly distinguished from each other, the motors will be referred to simply as motors 25 below.

Specifically, the motor 25f can output a driving force for driving the wheels 11a and 11b that are front wheels. The driving force output from the motor 25f is transmitted to the front differential device 27f coupled thereto via the wheels 11a and 11b and a driving shaft, and then the front differential device 27f transmits the driving force to be distributed to the wheels 11a and 11b. Note that an output shaft of the motor 25f can be coupled to the front differential device 27f via a speed reducer which is not illustrated.

In addition, the motor 25r can output a driving force for driving the wheels 11c and 11d that are rear wheels. The driving force output from the motor 25r is transmitted to the rear differential device 27r coupled thereto via the wheels 11c and 11d and a driving shaft, and then the rear differential device 27r transmits the driving force to be distributed to the wheels 11c and 11d. Note that an output shaft of the motor 25r can be coupled to the rear differential device 27r via a speed reducer which is not illustrated.

As described above, a vehicle driving force output from the motors 25 corresponds to, for example, the sum of a driving force output from the motor 25f for driving the front wheels and a driving force output from the motor 25r for driving the rear wheels.

The electric vehicle 1 further includes, for example, a brake pedal 33, a master cylinder 35, a hydraulic pressure supply unit 37, a brake device 31a, a brake device 31b, a brake device 31c, and a brake device 31d as illustrated in FIG. 1. Note that, when the brake device 31a, the brake device 31b, the brake device 31c, and the brake device 31d are not particularly distinguished from each other, the brake devices will be referred to simply as brake devices 31 below.

The brake pedal 33 receives brake operations from a driver. A brake operation is specifically an operation of depressing the brake pedal 33. The brake pedal 33 is coupled to the master cylinder 35 via a booster which is not illustrated.

The master cylinder 35 generates hydraulic pressure in accordance with a brake operation amount that is an amount by which the brake pedal 33 is depressed. The master cylinder 35 is coupled to the brake device 31a, the brake device 31b, the brake device 31c, and the brake device 31d, which are provided at the wheel 11a, the wheel 11b, the wheel 11c, and the wheel 11d, respectively, via the hydraulic pressure supply unit 37. The hydraulic pressure generated by the master cylinder 35 is supplied to each of the brake devices 31 via the hydraulic pressure supply unit 37.

The brake device 31a, the brake device 31b, the brake device 31c, and the brake device 31d generate a vehicle braking force that is a braking force acting on the electric vehicle 1 in accordance with at least a brake operation performed by the driver. Specifically, the brake device 31a, the brake device 31b, the brake device 31c, and the brake device 31d give the braking forces to the wheel H a, the wheel 11b, the wheel 11c, and the wheel 11d, respectively. Each of the brake devices 31 includes, for example, a brake caliper constituted by brake pads and a wheel cylinder.

The pair of brake pads are provided, for example, on both side faces of a brake disc, which rotates integrally with each wheel 11, to face each other. The wheel cylinder is formed inside the brake caliper, and pistons are provided to be slidable in the wheel cylinder. Tips of the pistons are provided to face the brake pads, and the brake pads move toward side faces of the brake disc with sliding of the pistons. Hydraulic pressure generated by the master cylinder 35 is supplied to the wheel cylinder of each of the brake devices 31. Accordingly, when the pistons and the brake pads inside the brake caliper move, both side faces of the brake disc are sandwiched by the pair of brake pads, and thereby braking forces are applied to the wheels 11.

As descried above, the vehicle braking force generated by the brake devices 31 is equivalent to, for example, the sum of braking forces generated by the brake devices 31 and applied to the wheels 11.

The hydraulic pressure supply unit 37 can adjust hydraulic pressure supplied to each of the brake devices 31. The hydraulic pressure supply unit 37 includes, for example, a pump, a control valve, and the like. The hydraulic pressure supply unit 37 may be capable of adjusting hydraulic pressure to be supplied to each of the brake devices 31 individually, or two brake systems may be used. By controlling operations of the hydraulic pressure supply unit 37, braking forces applied to the wheels 11 are controlled.

The electric vehicle 1 further includes, for example, a wheel rotation speed sensor 51a, a wheel rotation speed sensor 51b, a wheel rotation speed sensor 51c, a wheel rotation speed sensor 51d, an acceleration sensor 53, a brake pedal sensor 55, an accelerator pedal sensor 57, temperature sensors 59r and 59f, and the control apparatus 100 as illustrated in FIG. 1.

The wheel rotation speed sensors 51a, 51b, 51c, and 51d detect the rotation speeds of the wheels 11a, 11b, 11c, and 11d, respectively, and output the detection results. Note that, when the wheel rotation speed sensor 51a, the wheel rotation speed sensor 51b, the wheel rotation speed sensor 51c, and the wheel rotation speed sensor 51d are not particularly distinguished from each other, the wheel rotation speed sensors will be referred to simply as the wheel rotation speed sensors 51 below.

The acceleration sensor 53 detects acceleration generated in the electric vehicle 1 and outputs the detection result. As the acceleration sensor 53, for example, a sensor that can detect acceleration in three directions is used.

The brake pedal sensor 55 detects a brake operation amount that is an amount by which the brake pedal 33 is depressed and outputs the detection result.

The accelerator pedal sensor 57 detects an accelerator operation amount that is an amount by which an accelerator pedal, which is not illustrated, is depressed and outputs the detection result.

The temperature sensors 59r and 59f detect temperatures of the motors 25f and 25r, respectively, and output the detection results. Note that, when the temperature sensors 59r and 59f are not particularly distinguished from each other, the temperature sensors will be referred to simply as temperature sensors 59 below.

The control apparatus 100 includes a central processing unit (CPU) that is an arithmetic processing device, a read only memory (ROM) that is a memory element storing programs used by the CPU, arithmetic parameters, and the like, and a random access memory (RAM) that is a memory element temporarily storing parameters that are appropriately changed in execution of the CPU and the like.

Figure 2:
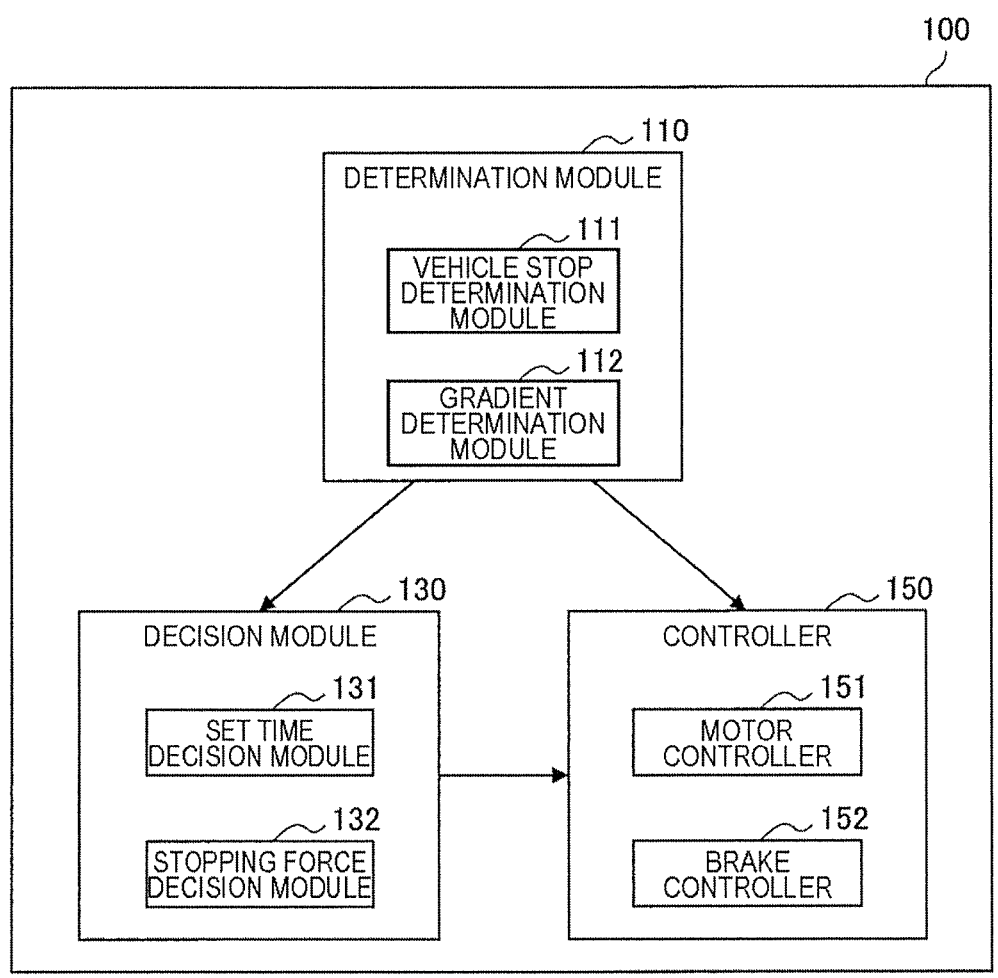
FIG. 2 is a block diagram illustrating an example of a functional configuration of the control apparatus according to the example.

The control apparatus 100 includes, for example, a determination module 110, a decision module 130, and a controller 150 as illustrated in FIG. 2.

The determination module 110 performs determination of whether the controller 150 is to execute hill-hold control, and outputs the determination result to the decision module 130 and the controller 150. The determination module 110 includes, for example, a vehicle stop determination module 111 and a gradient determination module 112.

The vehicle stop determination module 111 determines whether the electric vehicle 1 has stopped.

The gradient determination module 112 determines whether the road surface on which the electric vehicle 1 is positioned is uphill.

The decision module 130 decides a parameter to be used in hill-hold control executed by the controller 150 and outputs the decided parameter to the controller 150. The decision module 130 includes, for example, a set time decision module 131 and a stopping force decision module 132.

The set time decision module 131 decides a set time B that is used to switch from first hill-hold control to second hill-hold control which will be described below.

The stopping force decision module 132 decides a stopping force Fs generated to stop the electric vehicle 1 in hill-hold control.

The controller 150 controls operations of the devices of the electric vehicle 1 by outputting operation instructions to the devices. Specifically, the controller 150 can execute hill-hold control for maintaining the electric vehicle 1 in a stopped state in accordance with a determination result of the determination module 110. The controller 150 can execute the first hill-hold control and second hill-hold control as hill-hold control. The first hill-hold control is control for maintaining the electric vehicle 1 in a stopped state by using a vehicle driving force generated by the motors 25 as a stopping force Fs. On the other hand, the second hill-hold control is control for maintaining the electric vehicle 1 in a stopped state by using a vehicle braking force generated by the brake devices 31 as a stopping force Fs, without using a vehicle driving force. The controller 150 includes, for example, a motor controller 151 and a brake controller 152. Hill-hold control according to the example can be realized with cooperative control performed by the motor controller 151 and the brake controller 152.

The motor controller 151 controls operations of each of the inverters 23 by outputting an operation instruction to the inverters 23. Accordingly, driving forces output by the motors 25 are controlled, and thus a vehicle driving force is controlled. The motor controller 151 controls a vehicle driving force in hill-hold control without using accelerator operations. On the other hand, the motor controller 151 controls a vehicle driving force on the basis of an accelerator operation amount in a case in which hill-hold control is not executed. Note that the motor controller 151 may control a vehicle driving force without using accelerator operations, for example, in a case in which automatic brake control is executed or the like.

The brake controller 152 controls an operation of the hydraulic pressure supply unit 37 by outputting an operation instruction to the hydraulic pressure supply unit 37. Accordingly, braking forces applied to the wheels 11 by the brake devices 31 are controlled, and thereby a vehicle braking force is controlled. The brake controller 152 controls a vehicle braking force in hill-hold control without using a brake operation. On the other hand, the brake controller 152 controls a vehicle braking force basically on the basis of a brake operation amount in a case in which hill-hold control is not being executed. Note that the brake controller 152 may control a vehicle braking force without using a brake operation, for example, in a case in which automatic brake control is executed or the like.

In addition, the control apparatus 100 receives information output from each of the devices. Communication performed between the control apparatus 100 and each of the devices is realized using, for example, controller area network (CAN) communication. The control apparatus 100 receives information output from, for example, the wheel rotation speed sensors 51, the acceleration sensor 53, the brake pedal sensor 55, the accelerator pedal sensor 57, and the temperature sensors 59. The functions of the control apparatus 100 according to the example may be divided for a plurality of control apparatuses, and in that case, the plurality of control apparatuses may be coupled to each other via a CAN communication bus or the like.

2. OPERATION OF CONTROL APPARATUS

Next, an operation of the control apparatus 100 according to the example will be described with reference to FIGS. 3 to 10.

Figure 3:
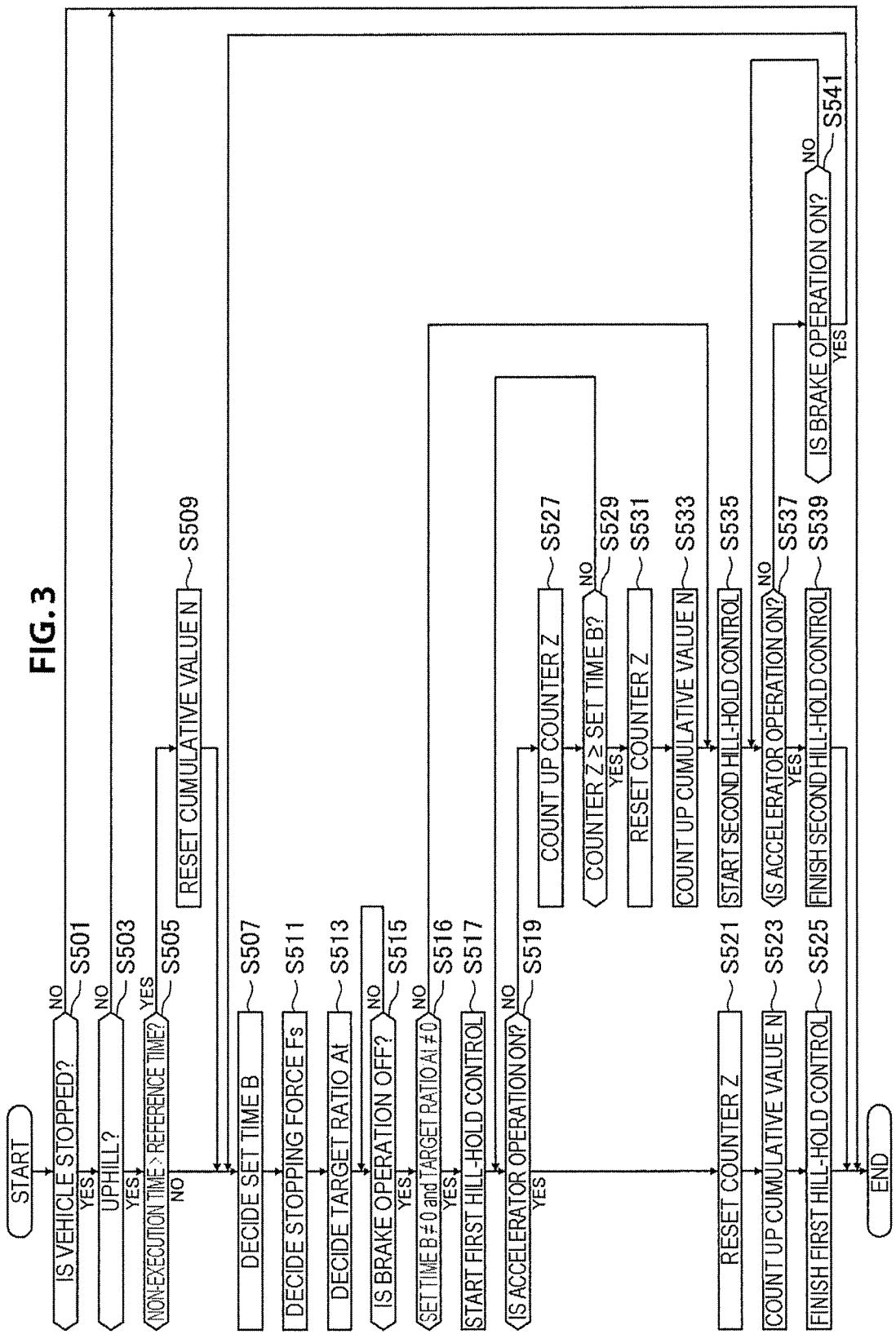
FIG. 3 is a flowchart illustrating an example of a flow of a process performed by the control apparatus according to the example.
Figure 4:
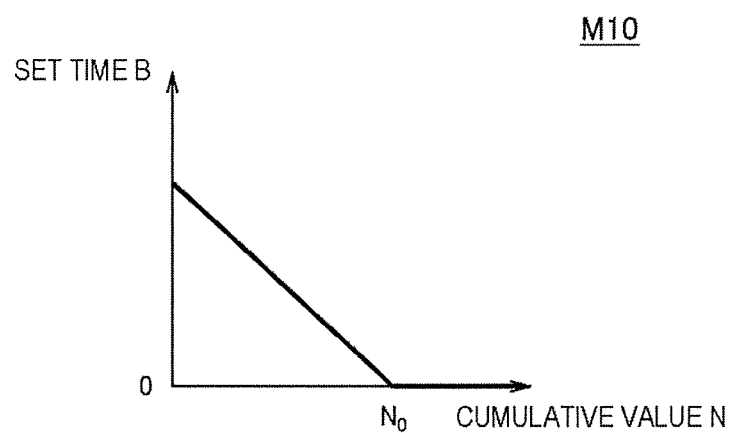
FIG. 4 is an explanatory diagram illustrating an example of a map defining a relation between a cumulative value N and a set time B used in a decision process of the set time B performed by the control apparatus according to the example.
Figure 5:
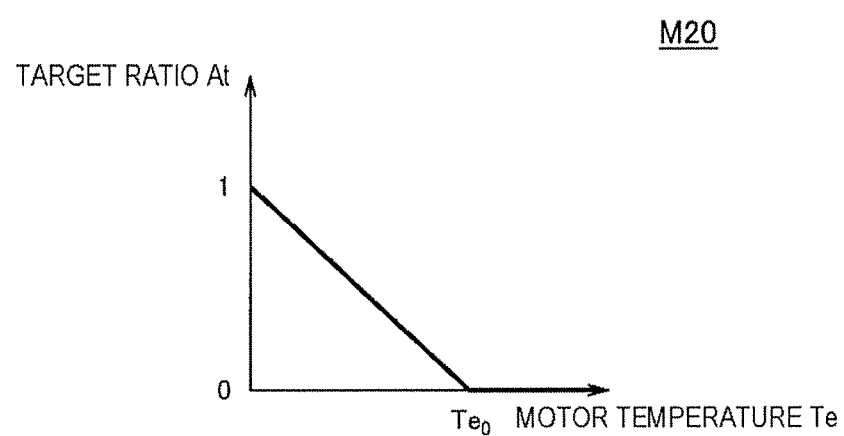
FIG. 5 is an explanatory diagram illustrating an example of a map defining a relation between a motor temperature Te and a target ratio At used in a decision process of the target ratio At performed by the control apparatus according to the example.
Figure 6:
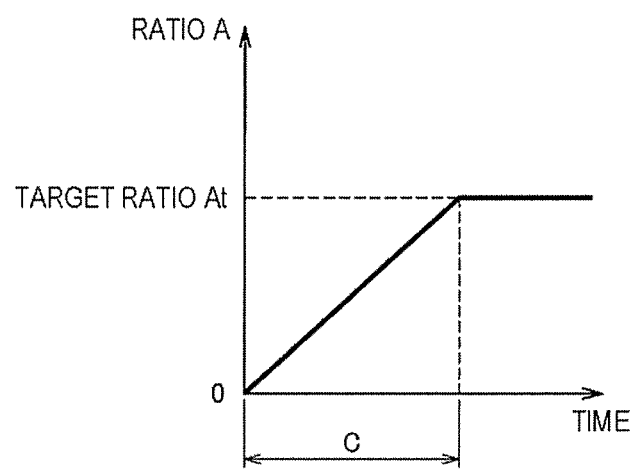
FIG. 6 is an explanatory diagram illustrating an example of temporal progress of a ratio A with respect to a stopping force Fs of a vehicle driving force in first hill-hold control performed by the control apparatus according to the example.

FIG. 3 is a flowchart illustrating an example of a flow of a process performed by the control apparatus 100 according to the example. The control flow illustrated in FIG. 3 is repeated, for example, at pre-set time intervals. FIG. 4 is an explanatory diagram illustrating an example of a map defining a relation between a cumulative value N and a set time B used in a decision process of the set time B performed by the control apparatus 100 according to the example. FIG. 5 is an explanatory diagram illustrating an example of a map defining a relation between a motor temperature Te and a target ratio At used in a decision process of the target ratio At performed by the control apparatus 100 according to the example. FIG. 6 is an explanatory diagram illustrating an example of temporal progress of a ratio A with respect to a stopping force Fs of a vehicle driving force in first hill-hold control performed by the control apparatus 100 according to the example.

When the control flow of FIG. 3 starts, first, the vehicle stop determination module 111 determines whether the electric vehicle 1 is stopped in Step S501. If the electric vehicle 1 is determined to be stopped (YES in Step S501), the control flow proceeds to Step S503. On the other hand, if the electric vehicle 1 is determined not to be stopped (NO in Step S501), the control flow of FIG. 3 ends. The vehicle stop determination module 111 calculates a vehicle speed that is a speed of the body of the electric vehicle 1 on the basis of, for example, a rotation speed of each of the wheels 11 and then determines whether the electric vehicle 1 is stopped on the basis of the vehicle speed of the electric vehicle 1.

The gradient determination module 112 determines whether the road surface on which the electric vehicle 1 is positioned is uphill in Step S503. If the road surface on which the electric vehicle 1 is positioned is determined to be uphill (YES in Step S503), the control flow proceeds to Step S505. On the other hand, if the road surface on which the electric vehicle 1 is positioned is determined not to be uphill (NO in Step S503), the control flow of FIG. 3 ends. The gradient determination module 112 calculates, for example, a pitch angle that is an angle of an inclination of the electric vehicle 1 in a pitch direction as a gradient of the road surface on the basis of acceleration generated in the electric vehicle 1 and thereby determines whether the road surface on which the electric vehicle 1 is positioned is uphill on the basis of the gradient of the road surface.

The set time decision module 131 determines whether a non-execution time in which the first hill-hold control is not executed exceeds a reference time in Step S505. If the non-execution time is determined to exceed the reference time (YES in Step S505), the control flow proceeds to Step S509. On the other hand, if the non-execution time is determined not to exceed the reference time (NO in Step S505), the control flow proceeds to Step S507. The non-execution time is, for example, a time elapsed from the end of the previous first hill-hold control, is stored in a memory element of the control apparatus 100, and is updated in accordance with the passage of time. The reference time is used to determine whether a possibility of the motors 25 being heated to a temperature of an excessively high temperature range due to the execution of the first hill-hold control is relatively low, and is set to, for example, about ten minutes. The reference time can be stored in a memory element of the control apparatus 100 in advance.

The set time decision module 131 resets the cumulative value N of the number of executions of the first hill-hold control in Step S509. The cumulative value N is stored in, for example, a memory element of the control apparatus 100. The set time decision module 131 rewrites the cumulative value N stored in the memory element to, for example, 0 in the cumulative value N reset process.

The set time decision module 131 decides the set time B on the basis of the cumulative value N in Step S507. The set time decision module 131 decides the set time B using, for example, a map M10 defining a relation between the cumulative value N and the set time B illustrated in FIG. 4.

Specifically, the map M10 defines the relation between the cumulative value N and the set time B such that the set time B becomes shorter as the cumulative value N becomes greater. Therefore, the set time decision module 131 can decide the set time B such that the set time B becomes shorter as the cumulative value N becomes greater.

In addition, the map M10 may define the relation between the cumulative value N and the set time B such that the set time B become shorter at a constant change rate as the cumulative value N has a greater value. Therefore, the set time decision module 131 can decide the set time B such that the set time B becomes shorter at a constant change rate as the cumulative value N becomes greater.

In addition, the map M10 may define the relation between the cumulative value N and the set time B such that the set time B is 0 when the cumulative value N exceeds a reference cumulative value $N_0$. Therefore, the set time decision module 131 can decide the set time B as 0 when the cumulative value N exceeds the reference cumulative value $N_0$. The reference cumulative value $N_0$ is used to determine whether a possibility of the motors 25 being heated to a temperature of an excessively high temperature range due to the execution of the first hill-hold control is relatively high, and can be stored in a memory element of the control apparatus 100 in advance.

Next, the stopping force decision module 132 decides the stopping force Fs generated in hill-hold control to stop the electric vehicle 1 in Step S511. Specifically, the stopping force decision module 132 decides the stopping force Fs on the basis of the gradient of the road surface.

For example, the stopping force decision module 132 calculates a pitch angle that is an angle of an inclination of the electric vehicle 1 in the pitch direction on the basis of acceleration generated in the electric vehicle 1 as the gradient of the road surface. In addition, the stopping force decision module 132 calculates a value obtained by multiplying a self-weight of the electric vehicle 1 by gravitational acceleration as the gravity caused by the self-weight. Then, the stopping force decision module 132 calculates a component of a rear direction that is the opposite direction to an application direction of the gravity caused by the self-weight of the electric vehicle 1 on the basis of the gradient of the road surface. Then, the stopping force decision module 132 decides a force having the same magnitude as the component of the rear direction of the gravity caused by the self-weight of the electric vehicle 1 as the stopping force Fs. The self-weight and gravitational acceleration of the electric vehicle 1 can be stored in a memory element of the control apparatus 100 in advance.

Next, the stopping force decision module 132 decides the target ratio At that is a ratio of a target driving force Fmt, which is a target value of a vehicle driving force in the first hill-hold control, to the stopping force Fs in Step S513.

The stopping force decision module 132 decides the target ratio At, for example, on the basis of a motor temperature Te that is a temperature of each motor 25. The stopping force decision module 132 may use, for example, an average value of temperatures of the motors 25$f$ and 25$r$ or a higher temperature between temperatures of the motors 25$f$ and 25$r$ as the motor temperature Te. The stopping force decision module 132 decides the target ratio At by using, for example, a map M20 defining a relation between the motor temperature Te and the target ratio At as illustrated in FIG. 5. The target ratio At can be a value in the range from 0 to 1.

Specifically, the map M20 defines a relation between the motor temperature Te and the target ratio At such that the target ratio At becomes lower as the motor temperature Te becomes higher. Therefore, the stopping force decision module 132 can decide the target ratio At such that the target ratio At becomes lower as the motor temperature Te becomes higher.

In addition, the map M20 defines the relation between the motor temperature Te and the target ratio At such that the target ratio At becomes lower at a constant change rate as the motor temperature Te becomes higher. Therefore, the stopping force decision module 132 can decide the target ratio At such that the target ratio At becomes lower at a constant change rate as the motor temperature Te becomes higher.

Furthermore, the map M20 may define the relation between the motor temperature Te and the target ratio At such that the target ratio At is 0 when the motor temperature Te exceeds a reference temperature $Te_0$. Therefore, the stopping force decision module 132 can decide the target ratio At as 0 when the motor temperature Te exceeds the reference temperature $Te_0$. The reference temperature $Te_0$ is used to determine whether a possibility of the motors 25 being heated to a temperature of an excessively high temperature range due to the execution of the first hill-hold control is relatively high, and can be stored in a memory element of the control apparatus 100 in advance.

Note that, although the case in which the target ratio At is decided on the basis of the motor temperature Te that is a temperature of the motors 25 has been described above, the stopping force decision module 132 may decide the target ratio At on the basis of a change rate of the motor temperature Te. The stopping force decision module 132 decides the target ratio At by using, for example, a map defining a relation between the change rate of the motor temperature Te and the target ratio At. The stopping force decision module 132 can decide the target ratio At such that the target ratio At becomes lower as the change rate of the motor temperature Te becomes higher. In addition, the stopping force decision module 132 can decide the target ratio At such that the target ratio At becomes lower at a constant change rate as the change rate of the motor temperature Te becomes higher. Furthermore, the stopping force decision module 132 can decide the target ratio At as 0 when the change rate of the motor temperature Te exceeds a reference change rate. The reference change rate is used to determine whether a possibility of the motors 25 being heated to a temperature of an excessively high temperature range due to execution of the first hill-hold control is relatively high, and can be stored in a memory element of the control apparatus 100 in advance. Note that the stopping force decision module 132 may decide the target ratio At on the basis of both the motor temperature Te and the change rate of the motor temperature Te.

Next, the controller 150 determines whether a brake operation has been interrupted by the driver in Step S515. If the brake operation is determined to have been interrupted (YES in Step S515), the control flow proceeds to Step S516. On the other hand, if the brake operation is determined not to have been interrupted (NO in Step S515), Step S515 is repeated. The controller 150 determines whether the brake operation has been interrupted on the basis of, for example, a brake operation amount.

The controller 150 determines whether the set time B is not 0 and the target ratio At is not 0 in Step S516. If it is determined that the set time B is not 0 and the target ratio At is not 0 (YES in Step S516), the control flow proceeds to Step S517. On the other hand, if it is determined that one or both of the set time B and the target ratio At are 0 (NO in Step S516), the control flow proceeds to Step S535.

The controller 150 starts the first hill-hold control in Step S517. The controller 150 starts the first hill-hold control when the brake operation is interrupted by the driver as described above. The controller 150 maintains the electric vehicle 1 in a stopped state in the first hill-hold control using a vehicle driving force of the motors 25 as the stopping force Fs.

Specifically, the controller 150 performs control such that the sum of the vehicle driving force and the vehicle braking force matches the decided stopping force Fs in the first hill-hold control. In addition, the controller 150 causes the vehicle driving force to shift to the target driving force Fmt and the vehicle braking force to a target braking force Fht in accordance with the start of the first hill-hold control. The target driving force Fmt and the target braking force Fht are target values of the vehicle driving force and the vehicle braking force respectively in the first hill-hold control.

Here, if the ratio of the vehicle driving force to the stopping force Fs in the first hill-hold control is set to A, the vehicle driving force and the vehicle braking force are expressed by the following expressions (1) and (2). Note that, in the expressions (1) and (2), Fm and Fh represent the vehicle driving force and the vehicle braking force respectively.

$$Fm = A \times Fs \quad (1)$$

$$Fh = (1-A) \times Fs \quad (2)$$

The controller 150 increases the ratio A of the vehicle driving force to the stopping force Fs in the first hill-hold control, for example, to the target ratio At in accordance with the start of the first hill-hold control. Note that the ratio A is 0 at the starting point of the first hill-hold control. Since the ratio A is increased to the target ratio At, the vehicle driving force and the vehicle braking force are shifted to the target driving force Fmt and the target braking force Fht respectively. The controller 150 may increase the ratio A to the target ratio At, for example, at a constant change rate as illustrated in FIG. 6.

In addition, the controller 150 may perform control such that an arrival time C, which is a time taken for the vehicle driving force to arrive at the target driving force Fmt in the first hill-hold control, becomes shorter as the set time B becomes shorter. The arrival time C corresponds to a time taken for the ratio A to arrive at the target ratio At as illustrated in FIG. 6.

Next, the controller 150 determines whether an accelerator operation by the driver has been performed in Step S519. If it is determined that an accelerator operation has been performed (YES in Step S519), the control flow proceeds to Step S521. On the other hand, if it is determined that no accelerator operation has been performed (NO in Step S519), the control flow proceeds to Step S527. The controller 150 determines whether an accelerator operation has been performed, for example, on the basis of an accelerator operation amount.

The controller 150 resets a counter Z which corresponds to a time elapsed from the start of the first hill-hold control with no accelerator operation performed in Step S521. The counter Z may be stored in, for example, a memory element of the control apparatus 100. The controller 150 rewrites the counter Z stored in the memory element to, for example, 0 in the reset process of the counter Z.

Next, the controller 150 counts up the cumulative value N in Step S523. The controller 150 increments the cumulative value N stored in the memory element by, for example, 1 in the counting-up process of the cumulative value N.

Next, the controller 150 finishes the first hill-hold control in Step S525. Then, the control flow illustrated in FIG. 3 ends.

The controller 150 counts up the counter Z in Step S527. The controller 150 performs counting-up such that, for example, the counter Z stored in the memory element has a value corresponding to the time elapsed from the start of the first hill-hold control with no accelerator operation performed in the counting-up process of the counter Z. Note that the counter Z has 0 at the starting point of the first hill-hold control.

Next, the controller 150 determines whether the counter Z has a value greater than or equal to the set time B in Step S529. If the counter Z is determined to have a value greater than or equal to the set time B (YES in Step S529), the control flow proceeds to Step S531. On the other hand, if the counter Z is determined to have a value smaller than the set time B (NO in Step S529), the control flow returns to Step S519.

In Step S531, the controller 150 resets the counter Z.

Next, in Step S533, the controller 150 counts up the cumulative value N.

Next, the controller 150 starts the second hill-hold control in Step S535. The controller 150 starts the second hill-hold control when the set time B elapses after the first hill-hold control is started with no accelerator operation performed by the driver as described above. The controller 150 maintains the electric vehicle 1 in a stopped state by stopping output of the vehicle driving force of the motors 25 and using the vehicle braking force of the brake devices 31 as the stopping force Fs in the second hill-hold control. Specifically, the controller 150 performs control such that a state of the vehicle driving force being generated is cancelled and the vehicle braking force matches the decided stopping force Fs in the second hill-hold control.

Next, the controller 150 determines whether an accelerator operation has been performed in Step S537. If an accelerator operation is determined to have been performed (YES in Step S537), the control flow proceeds to Step S539. On the other hand, if an accelerator operation is determined not to have been performed (NO in Step S537), the control flow proceeds to Step S541.

The controller 150 finishes the second hill-hold control in Step S539. Then, the control flow illustrated in FIG. 3 ends.

The controller 150 determines whether a brake operation has been resumed in Step S541. If it is determined that a brake operation has been resumed (YES in Step S541), the control flow returns to Step S507. On the other hand, if it is determined that a brake operation has not been resumed (NO in Step S541), the process returns to Step S537.

If the brake operation is determined to have been interrupted in Step S515 (YES in Step S515) after the brake operation is determined to have been resumed (YES in Step S541) in Step S541, the first hill-hold control can be started in Step S517. As described above, the controller 150 can start the first hill-hold control when the brake operation is resumed after the start of the second hill-hold control with no accelerator operation performed and the brake operation is further interrupted.

As described above, if the set time B is determined to be 0 in Step S516 (NO in Step S516), the control flow proceeds to the start process of the second hill-hold control (Step S535), rather than proceeding to the start process of the first hill-hold control (Step S517). As described above, the controller 150 can prohibit the first hill-hold control when the set time B is 0.

In addition, if the target ratio At is determined to be 0 in Step S516 (NO in Step S516), the control flow proceeds to the start process of the second hill-hold control (Step S535), rather than proceeding to the start process of the first hill-hold control (Step S517). As described above, the controller 150 can prohibit the first hill-hold control when the target ratio At is 0.

Next, progress of state quantities when hill-hold control according to a reference example and the example is executed will be described.

Figure 7:
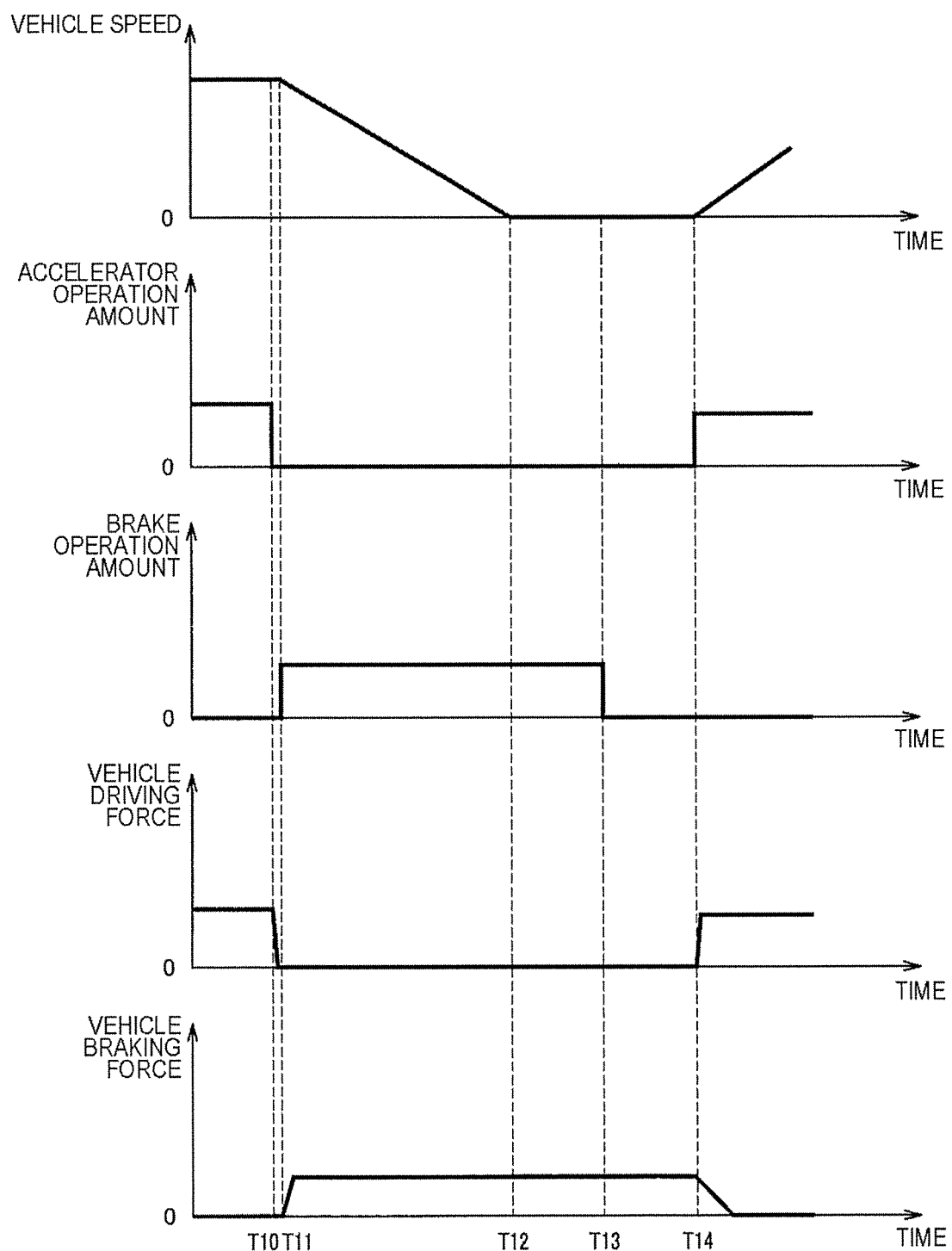
FIG. 7 is an explanatory diagram illustrating an example of progress of each of state quantities in a case in which hill-hold control according to a reference example is executed.
Figure 8:
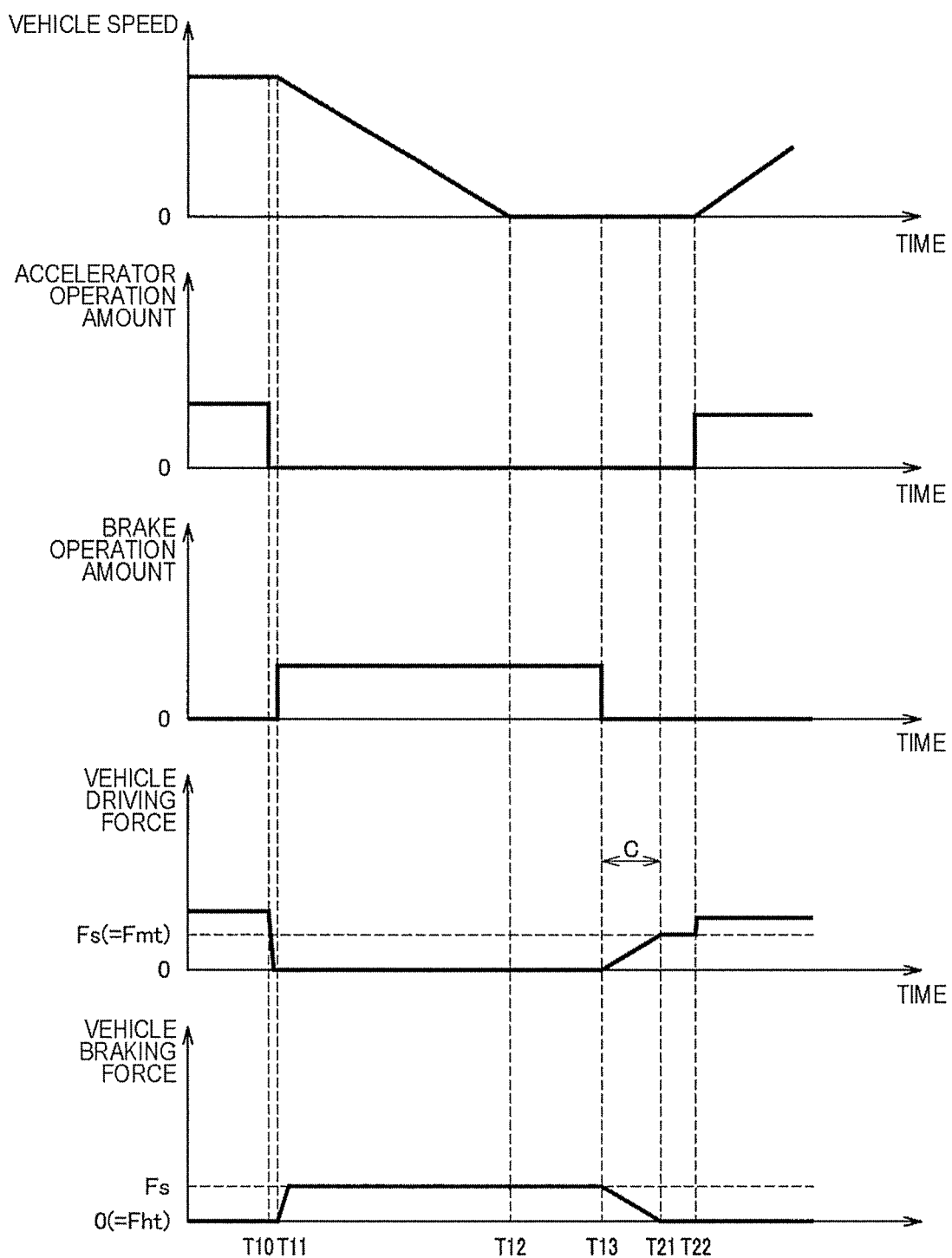
FIG. 8 is an explanatory diagram illustrating a first example of progress of each of the state quantities in a case in which hill-hold control according to the example of the present invention is executed.
Figure 9:
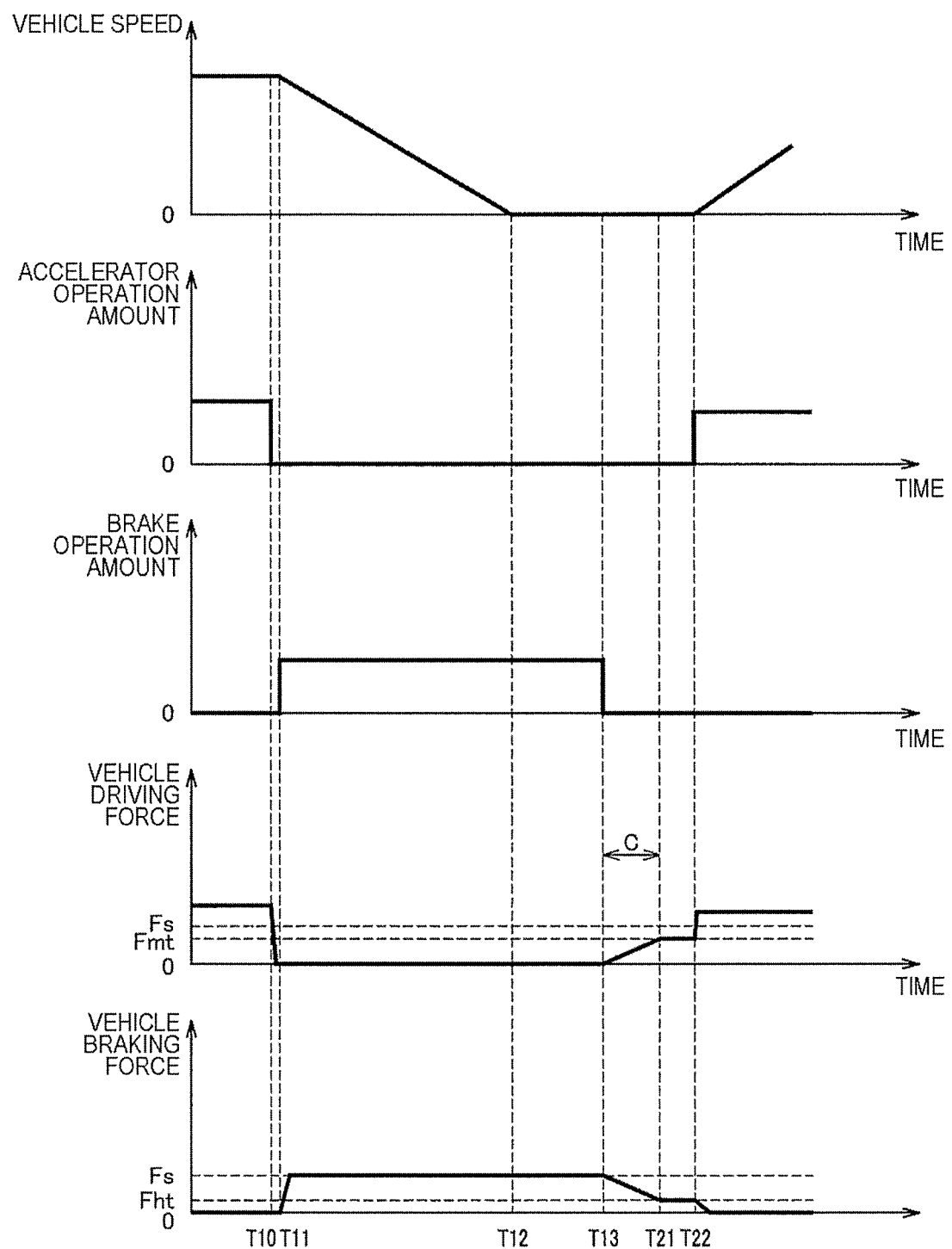
FIG. 9 is an explanatory diagram illustrating a second example of progress of each of the state quantities in a case in which hill-hold control according to the example is executed.
Figure 10:
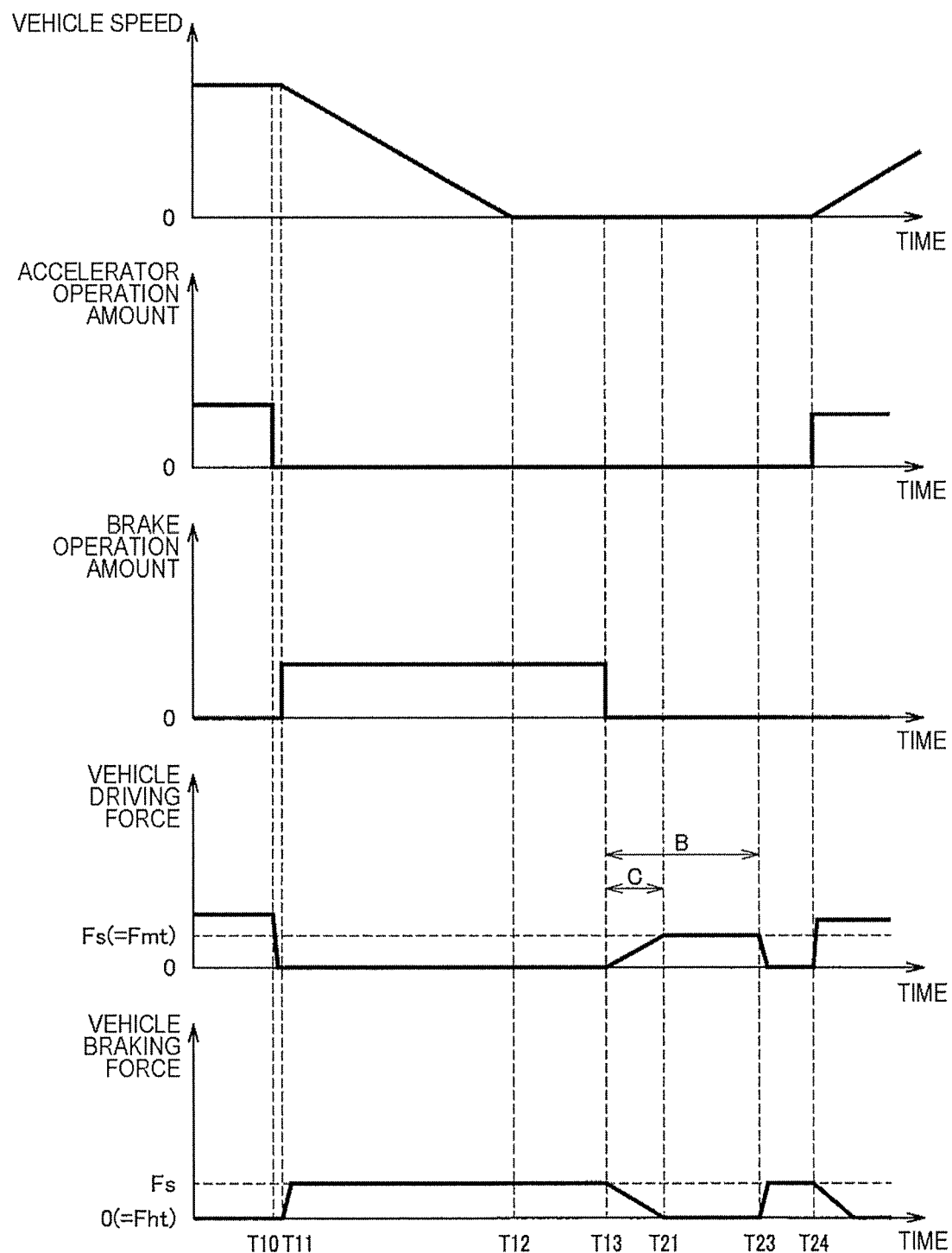
FIG. 10 is an explanatory diagram illustrating a third example of progress of each of the state quantities in a case in which hill-hold control according to the example is executed.

FIG. 7 is an explanatory diagram illustrating an example of progress of each of state quantities in a case in which hill-hold control according to a reference example is executed. FIG. 8 is an explanatory diagram illustrating a first example of the progress of each of the state quantities in a case in which hill-hold control according to the example is executed. FIG. 9 is an explanatory diagram illustrating a second example of the progress of each of the state quantities in the case in which hill-hold control according to the example is executed. FIG. 10 is an explanatory diagram illustrating a third example of the progress of each of the state quantities in the case in which hill-hold control according to the example is executed. In FIGS. 7 to 10, vehicle speeds, accelerator operation amounts, brake operation amounts, vehicle driving forces, and vehicle braking forces are illustrated as state quantities. In addition, the progress of each of the state quantities in a case in which the electric vehicle stops on an uphill slope and starts is illustrated in FIGS. 7 to 10.

In the reference example, the hill-hold control is executed by the electric vehicle, similarly to the above-described example. In the reference example, however, control corresponding to the first hill-hold control is not executed and only control corresponding to the second hill-hold control is executed as the hill-hold control unlike in the above-described example.

For example, an accelerator operation is interrupted while the electric vehicle is traveling at a time T10, and a state of a vehicle driving force being generated is cancelled in accordance with the interruption of the accelerator operation as illustrated in FIG. 7. Then, a brake operation is started and a vehicle braking force is generated in accordance with the start of the brake operation at a time T11. Accordingly, the vehicle speed decreases from the time T11 and the electric vehicle stops at a time T12.

Then, in the reference example, control corresponding to the second hill-hold control is started as the hill-hold control at a time T13 at which the brake operation is interrupted. That is, when the brake operation is interrupted in the reference example, control for maintaining the electric vehicle in a stopped state by using a vehicle braking force produced by the brake devices as the stopping force Fs is started without using a vehicle driving force. Accordingly, the state in which the vehicle braking force is generated is maintained from the time T13.

Then, an accelerator operation is performed at a time T14, and the hill-hold control ends. In addition, a vehicle driving force is generated in accordance with the start of the accelerator operation and thus the electric vehicle starts. Here, in the reference example, while the hill-hold control ends immediately after the time T14 at which the accelerator operation is started, the vehicle braking force may not abruptly decrease as illustrated in FIG. 7. Such a situation can be created due to hydraulic pressure for driving the brake devices.

Meanwhile, the first hill-hold control and the second hill-hold control can be executed as hill-hold control in the example of the present invention as described above.

For example, in the example of the present invention, the first hill-hold control is started as hill-hold control at a time T13 at which a brake operation is interrupted as illustrated in FIG. 8. That is, when the brake operation is interrupted, control for maintaining the electric vehicle 1 in a stopped state by using a vehicle driving force generated by the motors 25 as the stopping force Fs is started in the example. When the first hill-hold control is started, the vehicle driving force and the vehicle braking force shift to the target driving force Fmt and the target braking force Fht respectively. When 1 is decided as the target ratio At, for example, the target driving force Fmt matches the stopping force Fs and the target braking force Fht becomes 0 as illustrated in FIG. 8. The vehicle driving force arrives at the target driving force Fmt at a time T21 when the arrival time C elapses from the time T13, and is maintained at the target driving force Fmt from the time T21.

Then, when an accelerator operation is performed at a time T22 at which the first hill-hold control has been being executed, the first hill-hold control ends. In addition, the vehicle driving force increases due to the start of the accelerator operation, and thus the electric vehicle 1 starts. Here, in the example, no vehicle braking force is generated at the time T22 at which the accelerator operation is performed, for example, as illustrated in FIG. 8.

Note that, when a value smaller than 1 is decided as the target ratio At, for example, the target driving force Fmt has a value smaller than the stopping force Fs and the target braking force Fht has a value greater than 0 as illustrated in FIG. 9. Therefore, a part of the stopping force Fs is supplemented by the vehicle braking force in the first hill-hold control. Also in that case, at the time T22 at which the accelerator operation is performed, the generated vehicle braking force is smaller than in the reference example.

In addition, for example, the second hill-hold control is started at the time T13 when no accelerator operation is performed between the time T13 at which the first hill-hold control is started and the time T23 when the set time B elapses from the time T13 in the example as illustrated in FIG. 10. That is, in the example, when the set time B elapses after the first hill-hold control is started with no accelerator operation performed by a driver, control for maintaining the electric vehicle 1 in a stopped state is started by stopping output of a vehicle driving force from the motors 25 and using a vehicle braking force from the brake devices 31 as the stopping force Fs. When the second hill-hold control is started, the vehicle driving force has a value of 0 and the vehicle braking force matches the stopping force Fs.

Then, when an accelerator operation is performed at a time T24 at which the second hill-hold control has been executed, the second hill-hold control ends. In addition, the vehicle driving force increases due to the start of the accelerator operation, and thus the electric vehicle 1 starts.

3. EFFECTS OF CONTROL APPARATUS

Next, effects of the control apparatus 100 according to the example will be described.

When a brake operation is interrupted by a driver in the control apparatus 100 according to the example, the first hill-hold control for maintaining the electric vehicle 1 in a stopped state by using a vehicle driving force generated from the motors 25 as the stopping force Fs is started. Accordingly, no vehicle braking force may be generated or a generated vehicle braking force may be small at a time point at which an accelerator operation for starting the vehicle is performed. Therefore, a feeling of driving when the vehicle starts can be improved.

In addition, in the control apparatus 100 according to the example, when the set time B elapses with no accelerator operation performed by a driver after the first hill-hold control is started, the second hill-hold control for maintaining the electric vehicle 1 in a stopped state by stopping output of a vehicle driving force from the motors 25 and using a vehicle braking force from the brake devices 31 as the stopping force Fs is started. In addition, the set time B is decided on the basis of the cumulative value N of the number of executions of the first hill-hold control. The motors 25 can be heated to high temperatures more easily as the cumulative value N of the number of executions of the first hill-hold control becomes greater. Therefore, a time in which the first hill-hold control is executed can be regulated in accordance with a possibility of the motors 25 being heated to a temperature of an excessively high temperature range. Accordingly, the motors 25 can be prevented from being heated to an excessively high temperature due to the execution of the first hill-hold control. Therefore, degraded performance of and damage to the motors 25 can be avoided.

As described above, the control apparatus 100 according to the example can prevent the motors 25 from being heated to an excessively high temperature while improving the feeling of driving.

Furthermore, the control apparatus 100 according to the example can prevent the inverters 23 which are coupled to the motors 25 and in which currents to be supplied to the motors 25 flow from being heated to an excessively high temperature along with prevention of an excessively high temperature of the motors 25. Therefore, degraded performance of and damage to the inverters 23 can be avoided.

Furthermore, the control apparatus 100 according to the example can decide the set time B on the basis of the cumulative value N of the number of executions of the first hill-hold control as described above. Here, when the set time B is decided on the basis of, for example, temperatures of the motors 25 or a change rate of temperatures of the motors 25, it can be difficult to appropriately regulate a time in which the first hill-hold control is executed in accordance with a possibility of the motors 25 being heated to a temperature of an excessively high temperature range before the motors 25 is actually heated to a relatively high temperature. Therefore, in the control apparatus 100 according to the example, it is possible to prevent the motors 25 from being heated to an excessively high temperature beforehand. In addition, it is also possible to prevent the inverters 23 from being heated to an excessively high temperature.

In addition, the control apparatus 100 can decide the set time B such that the set time B becomes shorter as the cumulative value N becomes greater. Accordingly, the time in which the first hill-hold control is executed can be effectively regulated in accordance with the possibility of the motors 25 being heated to a temperature of an excessively high temperature range. Therefore, it is possible to prevent the motors 25 from being heated to an excessively high temperature due to the execution of the first hill-hold control more effectively.

In addition, the control apparatus 100 can decide the set time B to 0 when the cumulative value N exceeds the reference cumulative value $N_0$. Furthermore, when the set time B is 0, the first hill-hold control can be prohibited. Accordingly, the execution of the first hill-hold control can be suppressed in accordance with the cumulative value N when the possibility of the motors 25 being heated to a temperature of an excessively high temperature due to the execution of the first hill-hold control is relatively high. Therefore, it is possible to prevent the motors 25 from being heated to an excessively high temperature due to the execution of the first hill-hold control more effectively.

In addition, the control apparatus 100 can reset the cumulative value N when the non-execution time in which the first hill-hold control is not executed exceeds the reference time. Accordingly, it is possible to cancel the regulation on the time in which the first hill-hold control is executed when the possibility of the motors 25 being heated to a temperature of an excessively high temperature due to the execution of the first hill-hold control is relatively low. Thus, it is possible to avoid unnecessary regulation on the time in which the first hill-hold control is executed. Therefore, the feeling of driving can be improved more effectively.

In addition, the control apparatus 100 can perform control such that the sum of a vehicle driving force and a vehicle braking force matches the decided stopping force Fs in the first hill-hold control. Accordingly, it is possible to appropriately prevent the electric vehicle 1 from sliding backward in the first hill-hold control.

In addition, the control apparatus 100 can decide the stopping force Fs on the basis of a gradient of a road surface. Accordingly, the stopping force Fs can be appropriately decided, and thus it is possible to appropriately prevent the electric vehicle 1 from sliding backward more effectively.

In addition, the control apparatus 100 can decide the target ratio At, which is a ratio of the target driving force Fmt to the stopping force Fs in the first hill-hold control, such that the target ratio At becomes lower as the motor temperature Te becomes higher. Accordingly, a degree of the motors 25 being heated due to the execution of the first hill-hold control can be lowered as the motor temperature Te becomes higher. Therefore, it is possible to prevent the motors 25 from being heated to an excessively high temperature due to the execution of the first hill-hold control more effectively.

In addition, when the motor temperature Te exceeds the reference temperature $Te_0$, the control apparatus 100 can decide the target ratio At, which is a ratio of the target driving force Fmt to the stopping force Fs in the first hill-hold control, to 0. Furthermore, when the target ratio At is 0, the first hill-hold control can be prohibited. Accordingly, when the possibility of the motors 25 being heated to a temperature of an excessively high temperature due to the execution of the first hill-hold control is relatively high, the execution of the first hill-hold control can be suppressed in accordance with the motor temperature Te. Therefore, it is possible to prevent the motors 25 from being heated to an excessively high temperature due to the execution of the first hill-hold control more effectively.

In addition, the control apparatus 100 can decide the target ratio At, which is a ratio of the target driving force Fmt to the stopping force Fs in the first hill-hold control, such that the target ratio At becomes lower as a change rate of the motor temperature Te becomes higher. Accordingly, a degree of the motors 25 being heated due to the execution of the first hill-hold control can be lowered as the change rate of the motor temperature Te becomes higher. Therefore, it is possible to prevent the motors 25 from being heated to an excessively high temperature due to the execution of the first hill-hold control more effectively.

In addition, when the change rate of the motor temperature Te exceeds the reference temperature $Te_0$, the control apparatus 100 can decide the target ratio At, which is a ratio of the target driving force Fmt to the stopping force Fs in the first hill-hold control, to 0. Furthermore, when the target ratio At is 0, the first hill-hold control can be prohibited. Accordingly, when the possibility of the motors 25 being heated to a temperature of an excessively high temperature due to the execution of the first hill-hold control is relatively high, the execution of the first hill-hold control can be suppressed in accordance with the change rate of the motor temperature Te. Therefore, it is possible to prevent the motors 25 from being heated to an excessively high temperature due to the execution of the first hill-hold control more effectively.

In addition, the control apparatus 100 can perform control such that the arrival time C in which a vehicle driving force arrives at the target driving force Fmt in the first hill-hold control becomes shorter as the set time B becomes shorter. Accordingly, it is possible to cause the vehicle driving force to arrive at the target driving force Fmt appropriately within the set time B in the first hill-hold control. Therefore, the feeling of driving can be improved more effectively.

In addition, the control apparatus 100 can start the first hill-hold control when a brake operation is resumed without an accelerator operation after the second hill-hold control is started and then the brake operation is interrupted. Accordingly, even when a plurality of brake operations are performed before a start of the electric vehicle 1 while the vehicle stops, the first hill-hold control can be executed with respect to each of the brake operations, and therefore the feeling of driving can be improved more effectively.

4. CONCLUSION

As described above, according to the example, when a brake operation is interrupted by a driver, the first hill-hold control for maintaining the electric vehicle 1 in a stopped state by using a vehicle driving force generated by the motors 25 as the stopping force Fs is started. Accordingly, at a time point at which an accelerator operation for starting the vehicle is performed, no vehicle braking force can be generated or a generated vehicle braking force can decrease. Therefore, the feeling of driving when the vehicle starts can be improved.

In addition, in the control apparatus 100 according to the example, when the set time B elapses with no accelerator operation performed by a driver after the first hill-hold control is started, the second hill-hold control for maintaining the electric vehicle 1 in a stopped state by stopping output of the vehicle driving force from the motors 25 and using a vehicle braking force from the brake devices 31 as the stopping force Fs is started. Furthermore, the set time B is decided on the basis of the cumulative value N of the number of executions of the first hill-hold control. Thus, the time in which the first hill-hold control is executed can be regulated in accordance with the possibility of the motors 25 being heated to a temperature of an excessively high temperature range. Accordingly, it is possible to prevent the motors 25 from being heated to an excessively high temperature due to the execution of the first hill-hold control. Therefore, degraded performance of and damage to the motors 25 can be avoided.

As described above, according to the control apparatus 100 of the example, it is possible to prevent the motors 25 from being heated to an excessively high temperature while improving the feeling of driving. Furthermore, according to the control apparatus 100 of the example, since it is possible to prevent the inverters 23 that are coupled to the motors 25 and in which a current to be supplied to the motors 25 flows from being heated to an excessively high temperature, degraded performance of and damage to the inverters 23 can be avoided. Furthermore, according to the control apparatus 100 of the example, it is possible to prevent the motors 25 from being heated to an excessively high temperature beforehand in comparison to a case in which the set time B is decided on the basis of, for example, a temperature of the motors 25 or a change rate of temperatures of the motors 25. In addition, it is possible to prevent the inverters 23 from being heated to an excessively high temperature beforehand as well.

Although the electric vehicle 1 has been described above as an example of an electric vehicle in which the control apparatus 100 is mounted, a configuration of an electric vehicle in which the control apparatus 100 is mounted is not limited thereto. For example, an engine may be provided in the electric vehicle in which the control apparatus 100 is mounted. In that case, the engine can be used as, for example, a source of power to generate electric power charged into the battery 21.

In addition, although the instance in which motors of the present invention that can output vehicle driving forces are the motors 25f and 25r (that is, the instance in which the two motors of the motors 25f and 25r output the vehicle driving force) has been described above, the number of motors provided in an electric vehicle in which the control apparatus 100 is mounted is not limited thereto. For example, any one of the motors 25f and 25r may be omitted from the configuration of the electric vehicle 1. In that case, the other one of the motors 25f and 25r outputs the vehicle driving force. In addition, in a case in which the number of motors provided in an electric vehicle in which the control apparatus 100 is mounted is 1, the one motor may transmit driving forces to front wheels and rear wheels. Furthermore, for example, motors may be provided for each of wheels in an electric vehicle in which the control apparatus 100 is mounted. In that case, a total of four motors provided for the wheels output vehicle driving forces.

In addition, although the instance in which the brake devices 31 are so-called disc brakes has been described above, the brake devices 31 may be devices that generate vehicle braking forces at least in accordance with a brake operation performed by a driver, and a type of the brake devices 31 is not limited thereto. For example, the brake devices 31 may be so-called drum brakes. Furthermore, some of the brake device 31a, the brake device 31b, the brake device 31c, and the brake device 31d may be of a different type from the other brake devices 31. For example, the brake device 31a and the brake device 31b may be of a different type from the brake device 31c and the brake device 31d.

In addition, although the instance in which the acceleration sensor 53 is used to calculate a gradient of a road surface has been described above, a different sensor from the acceleration sensor 53 may be used to calculate a gradient of a road surface. As such a sensor, for example, a three-axis gyro sensor may be used. In that case, the acceleration sensor 53 may be omitted from the configuration of the electric vehicle 1.

In addition, the processes described using the flowcharts in the present specification may not necessarily be executed in that order illustrated in the flowcharts. Some of the processing steps may be executed in parallel. In the flowchart illustrated in FIG. 3, for example, the processes of Step S501 and Step S503 may not be executed in that order illustrated in the flowchart or may be executed in parallel. In addition, the processes of Step S507, Step S511, and Step S513 may not be executed in that order illustrated in the flowchart or may be executed in parallel. In addition, the processes of Step S521 and Step S523 may not be executed in that order illustrated in the flowchart or may be executed in parallel. In addition, the processes of Step S531 and Step S533 may not be executed in that order illustrated in the flowchart or may be executed in parallel. In addition, an additional processing step may be employed, or some of the processing steps may be omitted.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A control apparatus of an electric vehicle, the electric vehicle comprising a motor capable of outputting a vehicle driving force that is a driving force acting on the electric vehicle, and a brake device configured to generate a vehicle braking force that is a braking force acting on the electric vehicle in accordance with a brake operation performed by a driver, the control apparatus comprising:
a computer processing unit (CPU) that functions as a controller configured to start a first hill-hold control for maintaining the electric vehicle in a stopped state by using the vehicle driving force generated by the motor as a stopping force for stopping the electric vehicle when the brake operation is interrupted,
wherein, when a set time elapses after the first hill-hold control is started with no accelerator operation performed by the driver, the controller starts a second hill-hold control for maintaining the electric vehicle in the stopped state by stopping an output of the vehicle driving force from the motor and using the vehicle braking force from the brake device as the stopping force, and
wherein the CPU further functions as a set time decision module configured to decide the set time on a basis of a cumulative value of a number of executions of the first hill-hold control.

2. The control apparatus of an electric vehicle according to claim 1, wherein the set time decision module decides the set time in such a manner that the set time decrease as the cumulative value increases.

3. The control apparatus of an electric vehicle according to claim 2,
wherein, when the cumulative value exceeds a reference cumulative value, the set time decision module decides the set time as 0, and
wherein, when the set time is 0, the controller prohibits the first hill-hold control.

4. The control apparatus of an electric vehicle according to claim 1, wherein, when a non-execution time in which the first hill-hold control is not executed exceeds a reference time, the set time decision module resets the cumulative value.

5. The control apparatus of an electric vehicle according to claim 2, wherein, when a non-execution time in which the first hill-hold control is not executed exceeds a reference time, the set time decision module resets the cumulative value.

6. The control apparatus of an electric vehicle according to claim 1,
wherein the CPU further functions as a stopping force decision module configured to decide the stopping force,
wherein the controller performs a control in such a manner that a sum of the vehicle driving force and the vehicle braking force matches the decided stopping force in the first hill-hold control.

7. The control apparatus of an electric vehicle according to claim 2,
wherein the CPU further functions as a stopping force decision module configured to decide the stopping force,
wherein the controller performs a control in such a manner that a sum of the vehicle driving force and the vehicle braking force matches the decided stopping force in the first hill-hold control.

8. The control apparatus of an electric vehicle according to claim 6, wherein the stopping force decision module decides a ratio of a target value of the vehicle driving force to the stopping force in the first hill-hold control in such a manner that the ratio decreases as a temperature of the motor increases.

9. The control apparatus of an electric vehicle according to claim 7,
wherein the stopping force decision module decides a ratio of a target value of the vehicle driving force to the stopping force in the first hill-hold control in such a manner that the ratio decreases as a temperature of the motor increases.

10. The control apparatus of an electric vehicle according to claim 8,
wherein, when the temperature of the motor exceeds a reference temperature, the stopping force decision module decides the ratio of the target value of the vehicle driving force to the stopping force in the first hill-hold control as 0, and
wherein, when the ratio of the target value of the vehicle driving force to the stopping force in the first hill-hold control is 0, the controller prohibits the first hill-hold control.

11. The control apparatus of an electric vehicle according to claim 9,
wherein, when the temperature of the motor exceeds a reference temperature, the stopping force decision module decides the ratio of the target value of the vehicle driving force to the stopping force in the first hill-hold control as 0, and
wherein, when the ratio of the target value of the vehicle driving force to the stopping force in the first hill-hold control is 0, the controller prohibits the first hill-hold control.

12. The control apparatus of an electric vehicle according to claim 6, wherein the stopping force decision module decides a ratio of a target value of the vehicle driving force to the stopping force in the first hill-hold control in such a manner that the ratio decreases as a change rate of a temperature of the motor increases.

13. The control apparatus of an electric vehicle according to claim 7, wherein the stopping force decision module decides a ratio of a target value of the vehicle driving force to the stopping force in the first hill-hold control in such a manner that the ratio decreases as a change rate of a temperature of the motor increases.

14. The control apparatus of an electric vehicle according to claim 12,
wherein, when the change rate of the temperature of the motor exceeds a reference change rate, the stopping force decision module decides the ratio of the target value of the vehicle driving force to the stopping force in the first hill-hold control as 0, and
wherein, when the ratio of the target value of the vehicle driving force to the stopping force in the first hill-hold control is 0, the controller prohibits the first hill-hold control.

15. The control apparatus of an electric vehicle according to claim 13,
wherein, when the change rate of the temperature of the motor exceeds a reference change rate, the stopping force decision module decides the ratio of the target value of the vehicle driving force to the stopping force in the first hill-hold control as 0, and
wherein, when the ratio of the target value of the vehicle driving force to the stopping force in the first hill-hold control is 0, the controller prohibits the first hill-hold control.

16. The control apparatus of an electric vehicle according to claim 6, wherein the controller performs control in such a manner that a time taken for the vehicle driving force to arrive at a target value decreases as the set time decreases in the first hill-hold control.

17. The control apparatus of an electric vehicle according to claim 7, wherein the controller performs control in such a manner that a time taken for the vehicle driving force to arrive at a target value decreases as the set time decreases in the first hill-hold control.

18. The control apparatus of an electric vehicle according to claim 1, wherein, when the brake operation is resumed with no accelerator operation performed after the second hill-hold control is started and the brake operation is further interrupted, the controller starts the first hill-hold control.

19. The control apparatus of an electric vehicle according to claim 2, wherein, when the brake operation is resumed with no accelerator operation performed after the second hill-hold control is started and the brake operation is further interrupted, the controller starts the first hill-hold control.

20. A control apparatus of an electric vehicle comprising a motor capable of outputting a vehicle driving force that is a driving force acting on the electric vehicle, and a brake device configured to generate a vehicle braking force that is a braking force acting on the electric vehicle in accordance with a brake operation performed by a driver, the control apparatus comprising:

circuitry configured to start a first hill-hold control for maintaining the electric vehicle in a stopped state by using the vehicle driving force generated by the motor as a stopping force for stopping the electric vehicle when the brake operation is interrupted, wherein, when a set time elapses after the first hill-hold control is started with no accelerator operation performed by the driver, the circuitry starts a second hill-hold control for maintaining the electric vehicle in the stopped state by stopping an output of the vehicle driving force from the motor and using the vehicle braking force from the brake device as the stopping force, the circuitry being configured to decide the set time on a basis of a cumulative value of a number of executions of the first hill-hold control.

\* \* \* \* \*